Figure 1:
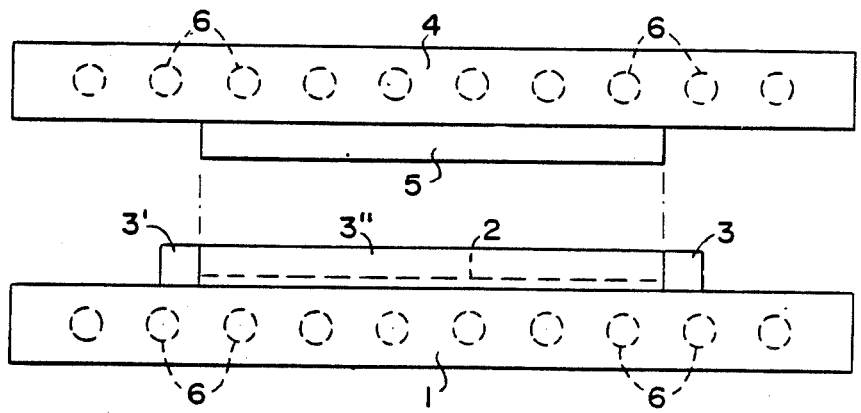

United States Patent [19]
Korb et al.

[11] Patent Number: 4,676,944
[45] Date of Patent: Jun. 30, 1987

[54] PROCESS FOR MOLDING THIN THERMOSET RESIN PLATES IN AN INVERTED CAVITY FLASH LAND MOLD SHUTTLE

[75] Inventors: Louis L. Korb; Keith E. Lauritsen, both of Sheboygan, Wis.

[73] Assignee: Plastics Engineering Company, Sheboygan, Wis.

[21] Appl. No.: 866,721

[22] Filed: May 27, 1986

Related U.S. Application Data

[60] Continuation of Ser. No. 576,949, May 30, 1984, abandoned, which is a division of Ser. No. 404,610, Aug. 2, 1982, abandoned.

[51] Int. Cl.$^4$ .................. B29C 43/04; B29C 33/46
[52] U.S. Cl. ............................ 264/325; 264/105; 264/319; 264/322; 264/335; 425/394; 425/406; 425/452
[58] Field of Search ............... 264/DIG. 31, 105, 319, 264/325, 320, 322, 324, 335; 425/185, 186, 192 R, 193, 194, 195, 233, 234, 347, 236, 349, 351, 357, 398, 399, 400, 406, 407, 413, 437, 452, 453, 451.9, 454, 810, 383, 384, 339, 394

[56] References Cited

U.S. PATENT DOCUMENTS

| | | | |
|---|---|---|---|
| 2,367,525 | 1/1945 | Rempel | 425/193 |
| 3,676,033 | 7/1972 | Buonaiuto | 264/51 |
| 3,907,950 | 9/1975 | Bickerdike et al. | 264/105 |
| 3,969,124 | 7/1976 | Stewart | 264/105 |
| 4,162,877 | 7/1979 | Nyberg | 425/406 |
| 4,301,222 | 11/1981 | Emanuelson et al. | 429/34 |
| 4,417,867 | 11/1983 | Bauer | 425/406 |
| 4,459,093 | 7/1984 | Asano | 425/412 |

FOREIGN PATENT DOCUMENTS 2408059  8/1975  Fed. Rep. of Germany ...... 264/105

OTHER PUBLICATIONS

Treatise on Ceramic Industries by E. Bourrg, 4th Ed. 1926, pp. 136-137.

Primary Examiner—Jan H. Silbaugh
Assistant Examiner—J. Durkin
Attorney, Agent, or Firm—Walter J. Monacelli

[57] ABSTRACT

The mold described herein comprises an upper and a lower portion in which the upper portion comprises an inverted cavity flash land mold section and the lower portion comprises a readily removable steel plate. By having the cavity flash land mold portion inverted and in the upper portion of the mold, the molded product is more easily separable by gravity from this upper mold portion which avoids the necessity to use means for lifting the molded product from the cavity and thereby avoids the distortions and stresses previously caused in the product by such lifting means. To aid in separating the product from the inverted cavity upper portion as the upper portion is separated from the lower flat sheet portion of the mold, releasing means, such as air from poppet valves in the upper area of the cavity mold, may be used to facilitate separation of the product from the upper cavity portion and deposition of this product on the lower flat sheet portion of the mold. This permits removal of the product while still retained on and supported by the lower flat sheet portion of the mold. This prevents out-of-place deformations and stresses in the molded product. This mold design is particularly suitable for the molding of very thin flat plates of considerable length and width.

4 Claims, 2 Drawing Figures

PROCESS FOR MOLDING THIN THERMOSET RESIN PLATES IN AN INVERTED CAVITY FLASH LAND MOLD SHUTTLE

This is a continuation of pending application Ser. No. 576,949, filed May 30, 1984, now abandoned, which is a division of application Ser. No. 404,610, filed Aug. 2, 1982, now abandoned.

BACKGROUND OF THE INVENTION

1. Field of the Invention

The present invention relates to an apparatus suitable for molding of flat, close-tolerance, thermosetting, graphite resin plates useful as precursors for carbonizing to vitreous carbon plates usable as separator plates in batteries or other electrochemical cell devices. More specifically, it relates to the molding of such plates which are very thin but of considerable dimensions in width and length. Still more specifically, it relates to a mold design having an inverted cavity arrangement in an upper portion of the mold permitting removal of the molded product on a flat sheet lower portion of the mold.

2. Description of the Prior Art

There are many prior patents relating to the composition of various thermosetting graphite resin blends useful for molding to dense graphite articles as described by U.S. Pat. Nos. 3,907,950, 3,969,124 and 3,624,569. However, little teaching exists relating to actual mold construction for shaping this material into uniformly thin, flat, thermoset, close-tolerance sheets or plates.

Rempel (U.S. Pat. No. 2,367,525) shows a design of a movable platen supported on rollers in sockets on the underside of the platen to permit the feeding of preforms into and removal of product from a compression or transfer mold. Most of the details are directed to the roller system for the massive, heavy platen. There is no indication of the location of the mold cavity and no indication that it could be in the upper section of the two-part mold.

Buonaiuto (U.S. Pat. No. 3,676,033) describes compression and transfer molding apparatus for making thermoplastic cellular products using a performing station to convert thermoplastic expandable beads by heat to a fused preform and then transferring this preform to the final forming station. This patent does not teach the making of flat plates of filled thermosetting materials. Neither Buonaiuto nor Rempel teach the use of an inverted cavity in an upper mold portion which closes onto a flat, movable plate.

As U.S. Pat. No. 4,301,222 (Emanuelson et al) reveals, separator plates for use in batteries and other electrochemical cell devices need to meet high standards in terms of many different characteristics including hydrogen permeability, corrosion resistance, electrical resistivity, thermal conductivity strength and electrolyte absorption resistivity. As this patent reveals, plates are preferred to be less than 0.050 inch thick. It also reveals that the largest such plates to have been molded have been 25×27 inches.

This same patent also acknowledges that "It has been desirable to make these plates thinner for improved electrical and thermal conductivity and for more economical and more versatile fuel cell configurations. This makes them even more difficult to fabricate with the requisite strength and impermeability." It also reveals desirable physical properties of such plates. Sufficient dead weight is applied vertically to each stack of a number of such plates to maintain plate flatness during the carbonizing period that converts the graphite-resin plate to vitreous carbon. The plate edges in the stack must be flush with each other and the plates must be fully supported to maintain separator flatness.

In certain industries, the need has arisen for uniformly thin plates having width and length of large dimensions with little or no waviness or bowing. Present mold designs have not been able to satisfy these needs. Out-of-plane deformation at the edges in applictions such as for separator plates is especially to be avoided. Moreover, when such plates are lifted out of a mold, it is almost impossible to avoid stresses and possible deformation at the areas by which said plates are lifted from the mold. Furthermore, when such plates are lifted out of a mold, the edges of the product are in close contact with the sidewalls of the mold in such a manner that friction against or sticking to the mold sidewall often causes the edges of the product to be distorted or wavy as compared to the inner areas of the plate.

In molding flat, thin, close-tolerance graphite-thermosetting resign plates (resin-plates) for after firing to vitreous carbon, plates have been previously molded through conventional compression molding techniques using positive type molds wherein the plate cavity is formed by means of a cavity block set between rails held in place on the lower heating platen. The force or plunger is attached to the upper heating platen. To form close-tolerance, flat, thin, precursor, graphite-thermosetting resin plates, experiments with positive type molds have been attempted. The resulting precursor graphite-filled thermosetting plates are relatively flaccid at the time of press opening and easily subject to distortion if lifted.

With such positive type molds, problems encountered in attempts to produce uniformly flat, thin, close-tolerance, large size plates (48"×48"×0.040"), have included shorts, warpage, center-bowing and plunger tilting. Further, with a positive mold, flashing is forced to rise perpendicularly out of the mold plane and around the mold plunger, resulting in part hangup in the cavity. Cycling often needs to be interrupted while the parts are freed and the mold cleaned. Forces exerted on the part to free it during the critical period following press opening often warps the hot flaccid curing part necessitating rejection of the part since critical tolerances are not obtained.

Such conventional flash type molds are impractical since these molds contain the cavity on the lower heating platen. Ejection of large size hot flaccid flat parts generally induce plane deformations, warpage and deviation from critical tolerances. Frequent out-of-plane deformations result from deflashing operations and from attempts to free sticking hot flaccid parts upon press opening. These cause defective plates, resulting in a large percentage of rejected plates. Plates free of out-of-plane deformations and without edge waviness are essential in certain applications such as batteries and electrochemical fuel cell devices.

SUMMARY OF THE INVENTION

In accordance with the present invention, it has been found that very thin plates of large dimensions in width and length, free of deformations, particularly in edge waviness, may be molded from graphite-resin mixtures using a new design of mold in which the cavity is in an upper part of the mold and the bottom portion of the mold comprises a flat sheet on which the flat plate of molded product is deposited when the mold is opened. This mold design permits the molding of thin plates of uniform thickness of less than 0.10 inch and preferably of less than 0.05 inch, and of length and width dimensions as high as 42 inches or higher. These molded plates are found to be particularly suitable as precursors for crbonization to vitreous carbon plates of satisfactory properties for use as separator plates in batteries and fuel cells.

This design is novel in that plates have previously been formed on molds which have the cavity in a lower heating platen with the molten resin mixture being forced perpendicularly upward to fill the mold. As previously indicated, removal of the molded product imparts stresses and deformations which give rise to warping and edge waviness not desired in the ultimate vitreous carbon plates. Moreover, when such plates are deflashed shortly after removal of the mold and while still in a flaccid state, further stresses are imparted to the molded plate. By having the molded product deposited and supported on the lower flat sheet portion of the mold of this invention, the various stresses and deformations are avoided and the flat sheet portion of the mold may be set aside until the product has cooled sufficiently to permit handling without deformation and a substitute preheated flat lower mold portion positioned for the next cycle of the mold. Moreover, by allowing the use of substitute flat sheet lower mold portions which may be used for temporary storage support, the mold is more adaptable to automation by having a supply of cleaned flat sheet lower mold portions available for immediate use. In addition to the various advantages cited above in the mold design of this invention there is a substantial reduction in the amount of scrap material and rejected plates. Previous methods for making similar plates, even when smaller in dimensions, have resulted in rejection of a large percentage of the molded plates. With the mold design of this invention, the number of rejected plates has been reduced drastically.

According to this new mold design, the molded product is parted from the upper mold portion principally by gravity force. To assist in this separation, particularly if there should be any sticking or adhering to the upper mold, various auxiliary means may be provided to aid and assure rapid and clean separation. For example, air-providing means such as a number of air poppet valves may be positioned on the upper surface of the upper mold cavity. Or instead, a number of pusher buttons may be installed in this same upper surface to aid, if necessary, in the separation of the molded product. Generally however, the main force in this separation is the gravitational force being applied when the mold is opened. However, if it is desired to insure that there is immediate rapid separation, operation of air poppet valves or pusher buttons may be effected simultaneously with opening of the mold.

Figure 2:
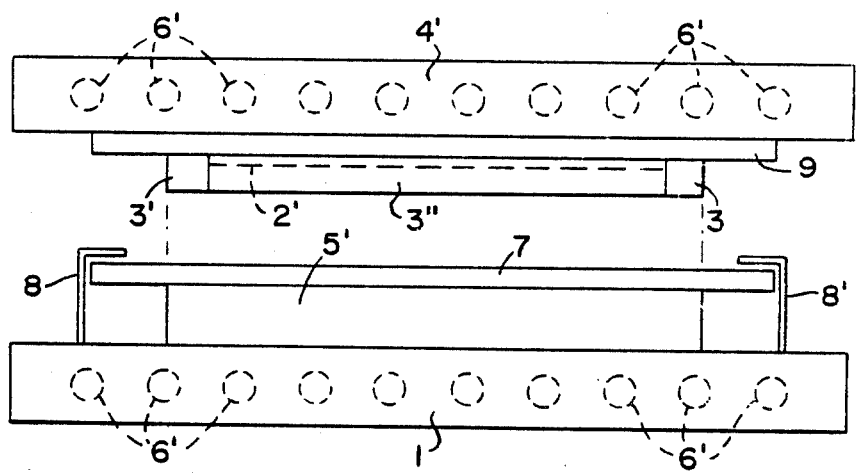

The description of the invention may be facilitated by reference to the drawings in which:

FIG. 1 is a front elevational view of the most relevant prior art type used for plate molding, specifically, a positive-type mold; and FIG. 2 is a front elevational view of a preferred modification of an inverted cavity mold of the present invention.

In FIG. 1, lower heating platen 1 supports cavity block 2 and rails 3,3' and 3''. Upper heating platen 4 has "force" 5 attached to the lower side thereof. In both platens, dotted circles 6 represent openings in the interior of the platen through which steam is passed to provide heat. This view shows the upper platen in a raised or open mold position. After preform buttons of the desired total weight of graphite-filled resin have been positioned in the cavity (not shown) of cavity block 2, the upper platen is lowered to a closed mold position with spacer 5 being closely positioned inside rails 3 and 3', and appropriate pressure and heat is applied.

In FIG. 2, lower heating platen 1 supports force 5' and force 5' supports plate 7. Dogs 8 and 8' extend upward from lower platen 1 to prevent sideward movement of plate 7. In the open mold position shown in FIG. 2, upper heating platen 4' has attached to its underside hold down plate 9 under which are attached rails 3, 3' and 3''. These three rails, plus a fourth rail in the back (not shown) define the perimeter of the cavity which will be filled with the resign when the upper platen is lowered to a closed mold position and the four rails touch the plate 7. Inside these rails is cavity block 2'. The difference between the thicknesses of the rails and that of caivty block 2' will determine the depth of the cavity and the thickness of the molded resin plate. After the appropriate period of pressure and heat, the mold is opened by raising upper platen 4' and the molded plate is removed by sliding out plate 7 and a new preheated plate with preheated resin buttons positioned thereon is slid into place.

The present invention permits the successful molding of large dimension 48"×48" or larger graphite-filled resin plates. Addditional advantages include minimizing of edge waviness, elimination of resin-plate hangup in the mold, minimizing of resin-plate stressing, adaptability to automation and faster production, ease of flash removal and minimizing of warpage and center bowing.

The mold design of this invention involves inverting the cavity or having the cavity positioned in the force or plunger and having the mold cavity close onto a relatively thin, flat, removable, steel force plate, preferably having an area larger than that of the inverted cavity. Advantages of the invention include assurance that uniform thickness of the resin plate is achieved and that tilting is eliminated since closure is by means of landing onto a flat surface. The invention also eliminates shot weight as a critical factor since excess material can freely excape by traveling outward on the horizontal plane until the rails contact the thermosetting flash or the steel plate. Centering of the bottom removable plate is not critical. An oversized steel plate, that is one larger in length and width than the force or plunger, eliminates any need for centering.

In the practice of this invention, thin, flat plates are molded from graphite-filled thermosetting resin on the surface of a rigid, preferably steel, force plate. For clarity through this application, the plate molded in accordance with the claimed invention will be referred to as the "resin plate". The flat, rigid, preferably steel, force plate on which the resin plate is molded will be referred to as the "steel plate".

The removable steel plate rests on the force which is attached to the lower heating platen. A means is provided to hold the steel plate in position during press operation and to prevent steel plate lifting during mold opening.

The steel plate may be one piece (i.e. unibody construction) or, for use in making larger resin plates, may be of a composite assembly. For example, four smaller steel plates 24"×24" each, may be joined together either by means of threaded fasteners or a retaining frame to form one large steel plate 48"×48". A composite assembly simplifies manufacture of large size steel plates and further expedites manufacture of large size resin plates. When dealing with larger sizes, for example over 36", machining problems are encountered because of the physical limitations of existing tooling equipment. Therefore, a composite assembly may often be preferred for manufacture of the steel plate. The molding cavity may be formed by machining and grinding or by other construction methods.

The molding apparatus of this invention lends itself to automation in several respects. The steel plate is readily removable. Therefore, another steel plate with preform charge thereon may be preheating while a steel plate is in the press. In another variation, a series of steel plates can be constructed, each having an area larger than the area of the cavity opening in the overhead plunger and each having a cavity on the lower surface. A series of steel plates may be stacked one upon the other. A preform charge may be placed upon the top surface of each respective steel plate. Upon compression, multiple resin plates can be formed and cured in one cycle. A means can be provided to enable sequential or simultaneous separation of each of the steel plates permitting removal of the cured resin plates and loading of the next preform charge.

In the modification shown in FIGS. 2, the molding cavity is formed on the lower surface of the upper heating platen. Attached to the lower surface of the upper heating platen is a hold-down plate to which is attached the flat cavity block defined by rails along the edges of the cavity block. The rails are taller than the cavity block. The height of the rails in comparision to the cavity block determines the depth of the molding cavity. The viscosity or flow of the graphite-thermosettable resin is also a factor in the thickness of the final molded resin plate. A poorer flowing material will result in a thicker part because of the resulting thicker flash upon which the rails land. Chroming of the rail lands and cavity block is preferred to further minimize part sticking.

In the specific embodiment of FIG. 2, the rails are approximately 0.040" taller than the flat cavity block. The rails need not be a separate assembly as the cavity can be ground into a large block of steel, thus forming rails around the entire periphery of the cavity.

In this invention, the inverted mold cavity closes onto the steel plate dogged into place on the lower heating platen. Upon press opening, the entire steel plate is slid out of the press carrying the molded part, eliminating part handling during the critical minutes following press opening. An air injection system, such as by means of poppets, can be incorporated into the top surface of the inverted cavity to optimize parting and depositing of the molded resin plate onto the lower steel plate.

Quick, easy removal of the steel plate with the molded product thereon is effected between the L-shaped dogs fastened on the right and left top sides of the lower heating platen positioned at the outer edge of the inserted steel plate. These dogs do not interfere with quick, easy removal of the steel plate since they permit the steel plate to slide forward or backward in the horizontal plane, but prevent left or right movement in the horizontal plane and also prevent steel plate travel upward outside of the horizontal plane. Other means that could work as well include other design channels and rails or tracks which have cross-sections such as T or -shape. The channels and rails may also be designed onto any surface of the steel plate. If the steel plate is made heavy enough, the steel plate in a manual setup could be held in place by its own weight. Positioning of the steel plate, since it is oversized in relation to the plunger, is not critical. It is contemplated that the oversized steel plate may be made out of a material other than steel, such as graphite, a graphite-filled thermoset resin or graphite-filled thermoset resin which has been fired to vitreous carbon. The specific material used to form the "steel plate" needs to have acceptable heat transfer properties or may be dependent on whether sufficient heat may be transferred from the upper platen to completely cure the resin plate. The advantages of the latter two materials would be to provide more uniform cooling rates to the resin plates being molded on their surface after removal from the press.

It is further contemplated that if the steel plate on whose surface the resin plates are being molded are large enough, for example over 48"×48", the steel plate's own weight again may stabilize and hold it acceptably in position on the lower platen, eliminating the need for providing a means for retaining the plate in position, such as opposing pairs of dogs, channels, or the like.

Meanwhile, the next steel plate loaded with graphite-resin shot can be removed from separate ovens maintained at 330° F. where they are preheated, inserted into the press and the cycle repeated. The removable steel plate not only eliminates part handling following press opening, but also facilitates automation of the entire resin plate molding operation. The removed resin plates can either be rack cooled or can be conveyed to a furnace for firing to vitreous carbon.

In a comparison test, a demonstration laboratory inverted cavity flash land mold shuttle is built according to the design shown in FIG. 2 to mold 8"×8"×0.040" graphite-filled resin plates. The die is set up on a 75 ton Lawton press. Corresponding test plates are molded in a 9"×9" laboratory scale positive type mold using the identical graphite-resin composition and identical molding conditions. The results are compared below in TABLE A.

TABLE A

| COMPARISON - INVERTED CAVITY FLASH LAND SHUTTLE VS. POSITIVE TYPE MOLD | | |
|---|---|---|
| | Inverted Cavity Flash Land Mold-8" × 8" × 0.040" | Positive Mold 9" × 9" × 0.040" |
| Flash Sticking | Minimal, almost non-existent | All around top punch and some on edge of lower cavity |
| Flash Control | Center Loaded | Critical preform placement and shot weight |
| Moldability | Excellent - no gas or venting problems, can be molded with or without a breath | Preform placement and shot weight critical - should be molded with a breath |
| Part Removal | Clean | Sticks on upper punch along flash line or hangs up in lower cavity |
| Shot Weight | Can vary - dimensions stable | Shot weight critical dimensional control |
| Scrap Rate | None in 22 straight shots | 15 out of 31–48% scrap |
| Warpage | Minimal | Lot of center bowing |
| Flash Line | Flash is in-line with | Flash perpendicular to |

TABLE A-continued

COMPARISON - INVERTED CAVITY FLASH LAND SHUTTLE VS. POSITIVE TYPE MOLD

| Inverted Cavity Flash Land Mold-8" × 8" × 0.040" | Positive Mold 9" × 9" × 0.040" |
|---|---|
| top of the molded part. Does not need removal before placing under cooling fixture for faster cycle times | molded part, must be deflashed before placing under cooling fixture, slowing cycle time Deflashing immediately upon press opening creates some out-of-plane deformations |

Although the invention has been shown and described with respect to a preferred embodiment, it must be understood by those skilled in the art that other changes and omissions in the form and detail thereof may be made without departing from the spirit and scope of the invention as defined in the following claims.

What is claimed is:

1. The process of preparing a thin molded plate of graphite-filled thermoset resin having substantial width and length and uniform thickness of less than 0.10 inch and free of distortions and waviness therein comprising the steps of:

(a) placing thermosetting molding material on a lower mold portion comprising a flat, rigid steel plate;
    (b) compressing said material by means of an upper mold portion comprising an overhead plunger having an inverted cavity of less than 0.10 inch depth and a horizontal land perpendicular to the depth of said cavity which land has its lower area located at the lower edge formed by the cavity opening and said horizontal land extends around the circumference of the cavity opening, said lower mold portion having its flat area larger than that of said cavity opening in said overhead plunger and adapted to receive said overhead plunger when said plunger is lowered into contact with said lower mold portion in such a manner that said horizontal land area of said plunger is in contact with said steel plate completely around the lowered periphery of said cavity;
    (c) heat curing the said material;
    (d) separating said upper mold portion from said lower mold portion; and
    (e) moving said steel plate with the molded product thereon from the area beneath said upper mold portion.

2. The process of claim 1 in which the thin molded plate is compressed and molded to a thickness of no more than 0.050 inch in depth.

3. The process of claim 2 in which the other dimensions of said plate are at least 25 inches.

4. The process of claim 2 in which the plate has other dimensions of approximately 42–48 inches.

* * * * *

UNITED STATES PATENT AND TRADEMARK OFFICE
CERTIFICATE OF CORRECTION

PATENT NO. : 4,676,944

DATED : June 30, 1987

INVENTOR(S) : Louis L. Korb and
Keith E. Lauritsen

It is certified that error appears in the above-identified patent and that said Letters Patent is hereby corrected as shown below:

```
Col. 2, line 11, change "applictions" to read "applications".
Col. 2, line 23, change "resign" to read "resin".
Col. 2, line 36, change "encounted" to read "encountered".
Col. 3, line  8, change "crbonization" to read "carbonization".
Col. 4, line 19, change "resign" to read "resin".
Col. 4, line 23, change "caivty" to read "cavity".
Col. 4, line 47, change "excape" to read "escape".
Col. 5, line 29, change "FIGS" to read "FIG".
Col. 6, line  3, change "-shape" to read "[ -shape."
```

Signed and Sealed this

Twenty-ninth Day of September, 1987

Attest:

DONALD J. QUIGG

Attesting Officer

Commissioner of Patents and Trademarks